May 11, 1943.                M. A. HAYDEN                2,318,855
                            POWER TRANSMISSION
                    Filed Dec. 30, 1939        2 Sheets-Sheet 2

Fig. 2

INVENTOR
MERRILL A. HAYDEN
BY
Ralph L. Trusdale
ATTORNEY

Patented May 11, 1943

2,318,855

UNITED STATES PATENT OFFICE 2,318,855

POWER TRANSMISSION

Merrill A. Hayden, Detroit, Mich., assignor to Vickers Incorporated, Detroit, Mich., a corporation of Michigan Application December 30, 1939, Serial No. 311,844

3 Claims. (Cl. 60—52)

This invention relates to power transmissions and more particularly to those of the type comprising two or more fluid pressure energy translating devices, one of which may function as a pump and another as a fluid motor.

The invention is particularly concerned with a power transmission system for actuating the movable slide of a machine tool. Hydraulic transmissions are extensively used for this purpose, and there are available on the market standard control panel assemblies which provide the necessary valving and control equipment for producing automatically certain cycles of tool slide movement among them being a cycle comprising a rapid traverse movement forward, a coarse feed movement forward, a fine feed movement forward, and a rapid return with a stop at the end of the return movement. There is occasionally need for a power transmission system with control means for providing a different cycle of slide movement which includes both rapid traverse and feed movements in the return direction as well as in the forward direction.

It is an object of the present invention to provide a power transmission system utilizing a standard control panel assembly of the type above described and providing a cycle of motor movements which includes both rapid traverse and feed movements in both directions.

Further objects and advantages of the present invention will be apparent from the following description, reference being had to the accompanying drawings wherein a preferred form of the present invention is clearly shown.

In the drawings:

Figure 2 is a schematic chart of the circuit embodied in Figure 1 showing the conditions of flow through the various valves during different stages of operation.

Figure 1:
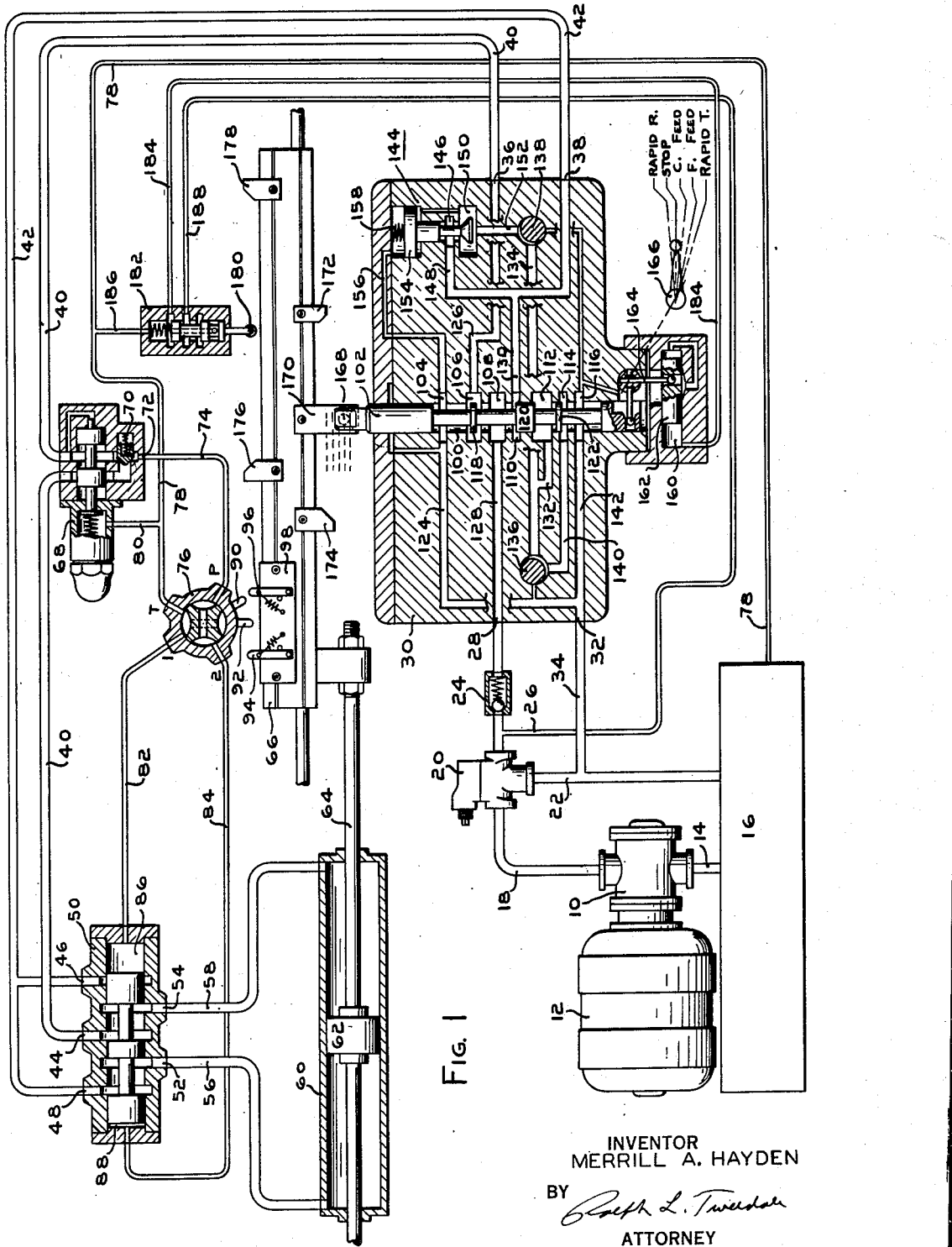
Figure 1 is a diagrammatic view of a power transmission system embodying a preferred form of the present invention.

There is illustrated in Figure 1 a hydraulic power transmission system comprising a pump 10 which may be driven by a suitable prime mover such as an electric motor 12 and which has a suction conduit 14 for withdrawing oil from the tank 16. A delivery conduit 18 incorporates a conventional relief valve 20 for bypassing oil to tank through a conduit 22 whenever a predetermined pressure is exceeded in the delivery conduit 18. The delivery conduit 18 also includes a spring-loaded, back-pressure valve 24 for maintaining a low degree of pressure in the conduit 18 ahead of the valve 24 which pressure is made available through a branch conduit 26 for pilot actuation of various valves later to be described.

The conduit 18 leads to the pressure inlet port 28 of a standard control panel 30 such as is widely used for providing cycles of rapid traverse forward, feed, and rapid return. The return port 32 of the panel 30 is connected by a conduit 34 with the tank conduit 22. The motor ports 36 and 38 of the panel 30 connect by conduits 40 and 42 with the pressure and tank ports 44 and 46—48 respectively of a pilot-operated, four-way, reverse valve 50. Motor ports 52 and 54 are connected by conduits 56 and 58 with the opposite ends of a table-operating cylinder 60 having a piston 62 reciprocably mounted therein. A rod 64 of piston 62 is connected to actuate a machine tool slide 66 as is well known in the art.

The conduit 40 has placed in series therein a pressure-operated sequence valve 68 which normally blocks flow through the conduit 40 in the direction from right to left in Figure 1 until a predetermined pressure in the right-hand portion of the conduit has been built up. The valve 68 also incorporates a check valve 70 open to free flow through conduit 40 from left to right.

A port 72 of the valve 68, which is always in communication with the right-hand portion of conduit 40 whether the valve 68 be open or closed, connects by a conduit 74 with the pressure port P of a rotary four-way pilot valve 76. The tank port T of the latter connects to tank by a conduit 78, a branch 80 serving also to drain seepage from the sequence valve 68. The motor ports 1 and 2 of the valve 76 are connected by conduits 82 and 84 with the right and lefthand operating chambers 86 and 88 of the pilot-operated valve 50.

The valve 76 has an operating fork consisting of two levers 90 and 92 which lie in different planes parallel to the plane of the paper and are in the paths of travel of a pair of pivoted dogs 94 and 96 respectively. The latter are pivotally mounted on a plate 98 adjustably mounted on the slide 66. The dog 96 is arranged to pass under the lever 90 during leftward travel of the slide 66 but to actuate the lever 90 counterclockwise during rightward travel of the slide at a point just before reaching the central position shown in Figure 1. Likewise the dog 94 is arranged to pass under the lever 92 during rightward travel of the slide and to actuate the lever 92 clockwise during leftward movement just before reaching central position illustrated.

The panel 30 comprises a main valve bore 100 in which is reciprocably mounted a main valve plunger 102. The bore 100 is provided with a series of annular ports 104, 106, 108, 110, 112, 114, and 116 of varying width and spacing as shown in the drawings while the plunger 102 is provided with piston heads 118, 120 and 122 adapted to selectively connect various of the ports together or block them from communication with one another. A passage 124 connects port 104 with the tank port 32. A passage 126 connects port 106 with motor port 36. A passage 128 connects port 108 with pressure port 28. A passage 130 connects port 110 with motor port 38. A passage 132 connects to a branch passage 134 which in turn connects between two adjustable throttles 136 and 138. A passage 140 connects port 114 with throttle 136. A passage 142 connects port 116 with the tank port 32.

A hydrostatic valve generally designated as 144 is provided in the panel 30 and has its incoming port 146 connected by a branch conduit 148 with the passage 130 and its outgoing port 150 connected by a passage 152 with the throttle 138. The valve 144 has its operating piston 154 subject to pressure in the port 150 tending to close the valve and subject to tank pressure transmitted from port 104 through a branch conduit 156 tending to open the valve. A spring 158 biases the valve piston downwardly with a light force. The hydrostatic flow control valve 144 serves to maintain a predetermined pressure drop between a point ahead of the throttles 138 and 136, namely, the port 150, and a point beyond the throttles, namely, the tank port 32.

The plunger 102 is adapted to selectively direct flow returning from the motor either to tank directly for rapid traverse of the slide or through hydrostatic valve 144 and throttle 138 only for coarse feed or through hydrostatic valve 144 and both throttles 138 and 136 for fine feed. The hydrostatic valve 144 by maintaining a constant pressure drop across the throttles permits the throttles to be manually adjusted to any desired opening and thereby maintains the rate of slide movement constant regardless of variations in resistance which the slide encounters.

The plunger 102 is shiftable between five positions to accomplish these connections and also to provide a connection for rapid reverse flow through conduits 40 and 42 and also to bypass the pump delivery directly to tank when it is desired to stop the motor. These positions are respectively designated rapid traverse, fine feed, coarse feed, stop and rapid return and are arranged in that order of vertical movement of the plunger 102.

The plunger 102 may be operated from anyone of three operating means. One operating means comprises a cylinder 160 mounted at the lower portion of the panel and having a piston 162 reciprocable therein. The piston 162 is connected with the plunger 102 by a bell crank arrangement 164, whereby leftward movement of the piston affects upward movement of the plunger 102 and vice versa. Plunger 102 may be also operated manually by a hand lever 166 which is rigidly secured to the pivot of the bell crank arrangement 164. A third operating means comprises a roller 168 provided on the upper end of plunger 102 and arranged in the path of various cams adjustably mounted on the slide 66. Thus when the cam 170, which is in the nature of a hook cam, contacts roller 168 it will lift the plunger 102 from its rapid return position to its stop position. A cam 172 may be provided and of proper length to depress the roller 168 from rapid traverse position to coarse feed position while a similar cam 174 may be arranged to depress the roller 168 from rapid traverse position to fine feed position. The cam arrangement shown is merely an example of one of the many arrangements that may be provided for operating the plunger 102 between various positions at various points in the travel of the slide 66.

The slide 66 also carries a pair of cams 176 and 178 adapted to contact a roller 180 carried by the stem of a three-way pilot valve 182. Thus when either cam 176 or 178 contacts the roller 180, the pilot valve is shifted to cut off its cylinder line 184 from the tank connection 186 and to connect the cylinder line with a pressure connection 188. The pressure connection 188 leads to the branch conduit 26 from the main pump delivery line 18 while the cylinder connection 184 leads to the left-hand end of cylinder 160.

In operation, starting with the parts in the position of Figure 1, that is, the stop position illustrated in Figure 2, with the pump 10 operating, oil is withdrawn from tank 16 through suction conduit 14 and delivered through conduit 18, back-pressure valve 24, port 28, and passage 128 to the port 108 of the main valve bore 100. Due to the position of the spool 102, a free passage is established upwardly into port 106 and thence to port 104 from which the oil returns to tank through passage 124, port 32 and conduits 34 and 22. The entire pump delivery is thus by-passed at no pressure and the slide 66 accordingly remains stationary. In this and the following description the righthand portion of Figure 2 shows the flow acutally occurring by solid arrows and shows pressure applied or exhausted by dotted arrows.

When it is desired to initiate a cycle of slide movements the operating handle 166 may be shifted from stop position to rapid traverse position illustrated in the second column from the left in Figure 2. Under these conditions the pump delivery is directed from port 108 to port 106 and through passage 126, port 36, and conduit 40 to the sequence valve 68. Since there is a free passage for oil out the port 72 through conduit 74, ports P and 2 of valve 76, and conduit 84 to the operating chamber 88 of valve 50, the latter valve is first shifted before any significant pressure can build up in the righthand part of the conduit 40. As soon as the valve 50 is completely shifted, no further oil can pass through port 72 so that the pressure builds up opening valve 68 and admitting the full pump delivery to the lefthand portion of conduit 40. This oil is directed by valve 50 from port 44 to port 52 and conduit 56 for shifting the piston 62 to the right. Oil returning from the right-hand end of cylinder 60 passes through conduit 58, ports 54 and 46 of valve 50, conduit 42, port 38, passage 130, port 110, across ports 112 and 114 to port 116, through passage 142, port 32 and conduits 34 and 22 to the tank. Since this discharge path is substantially unrestricted, the slide 66 travels to the right at a speed determined by the volumetric delivery rate of the pump 10 which gives a comparatively rapid traverse movement.

As soon as the slide reaches a point where the cam 174 contacts roller 168, the plunger 102 is shifted downwardly to fine feed position illustrated in the third column of Figure 2. Under these conditions the flow from the pump to the left-hand end of cylinder 60 is the same as before, the return flow, however, being blocked at port 110 so that fluid entering port 38 of the panel 30 must flow through passage 148, hydrostatic valve 144, passage 152, throttle 138, passage 134, throttle 136, passage 140, port 114 which is open to port 116, and from the latter through passage 142 to the tank port 32. Since the throttle 136 is much smaller than the throttle 138, the adjustment of the former determines the rate at which oil can pass from the motor. The excess quantity of oil delivered by the pump over that required to shift the slide 66 at the slow rate is bypassed to tank through the relief valve 20 and bypass conduit 22, it being understood that the relief valve 20 maintains a constant high pressure in the delivery conduit 18.

When the slide 66 has traveled further to the right so that cam 176 contacts roller 180, the valve 182 is shifted to connect cylinder line 184 with the pressure line 188 thus admitting pressure fluid to the operating cylinder 160 and shifting piston 162 to the right. This movement shifts the main plunger 102 downwardly into rapid return position illustrated in the fourth column of Figure 2. Under these conditions the pump delivery entering port 108 is directed to port 110 and through passage 130, port 38, and conduit 42 to the port 46 of valve 50. The latter remains in its righthand position to which it was shifted at the start of the rapid traverse forward stroke and accordingly directs the pressure fluid to port 54 and through conduit 58 to the righthand end of cylinder 60. The slide 66 accordingly moves to the left discharging oil through conduit 56, ports 52 and 44 of valve 50, conduit 40, passing freely through check valve 70 and into port 36 of the panel 30. Flow conditions through passage 126, ports 106 and 104, passage 124, port 32, and conduits 34 and 22 to the tank. Since this return path is unrestricted, the leftward travel takes place at a rapid rate.

When the slide reaches the central position illustrated in Figure 1 the hook cam 170 contacts the lower portion of roller 168 lifting the main plunger 102 to the stop position shown in the first column of Figure 2. The slide 66 is accordingly stopped and the pump delivery bypassed to tank as previously described.

To initiate a second cycle of operation the handle 166 is again operated to lift the plunger 102 to rapid traverse position. The pump delivery is directed through the panel 30 to conduit 40 as previously described, and the first flow passes out port 72 and through pipe 74 to port P of valve 76. Since the latter was shifted by contact of dog 94 with lever 92 as the slide 66 approached center position in its return movement, the pressure oil is directed to the port 1 and through conduit 82 to the operating chamber 86, thus shifting valve 50 back to the position illustrated in Figure 1.

When the pressure in conduit 40 builds up to open valve 68, the pressure oil is directed from port 44 of valve 50 to port 54 and through conduit 58 to the righthand end of cylinder 60, thus causing the slide 66 to travel to the left instead of to the right as was described previously. The leftward cycle is similar to the rightward cycle previously described except that the slide movement takes place on the left side of central position. In addition, since the cam 172 is long enough to depress plunger 102 only to the coarse feed position, the feeding movement takes place at a more rapid rate. This is due to the fact that the oil returning from the motor and entering the motor port 38 of panel 30 is directed through passage 148, hydrostatic valve 144, throttle 138, passages 134 and 132 to port 112 which in this position of the plunger is open to ports 114 and 116, thus permitting the oil leaving the throttle 138 to discharge directly to tank without having to flow through throttle 136. Thus the throttle 138 alone determines the speed of movement during the coarse feed operation.

The construction of the panel 30 illustrated is similar to that disclosed in the copending application of Herman, Harrington and Twyman, Serial No. 155,652, filed July 26, 1937, entitled Hydraulic feed control panel, which issued February 24, 1942 as Patent No. 2,274,603. It will be understood that such panels are standard articles of commerce and are available in the form disclosed as well as in other forms for the purpose of providing the customary rapid traverse, feed, and rapid return cycle of movements.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination with means forming a source of pressure fluid, fluid motor means connected to the source for operation thereby, and control means for selectively varying the rate and direction of fluid delivery to the motor including a first control unit having a member shiftable between four positions to selectively deliver fluid to the motor at a rapid advance rate, deliver fluid to the motor at a feed advance rate, deliver fluid to the motor at a rapid return rate, or deliver fluid back to the source directly, a second control unit comprising a four-way reversing valve connected in series with the first control unit and having a member shiftable between only two positions to selectively deliver fluid to the motor in either direction, and means responsive to motor travel for selectively shifting said members in sequence to produce a cycle of motor travel including a forward and return stroke in one direction with respect to an intermediate position of the motor and alternately therewith a forward and return stroke in the opposite direction with respect to said intermediate position, said cycle including a feed movement during each of said forward strokes and a stop at the end of each return movement, said selective shifting means including a member pre-set during the return movement of the motor for conditioning the second control unit to be shifted only when the first control unit has been shifted to its rapid advance position.

2. In a hydraulic power transmission system the combination with means forming a source of pressure fluid, fluid motor means connected to the source for operation thereby, and control means for selectively varying the rate and direction of fluid delivery to the motor including a first control unit having a member shiftable between four positions to selectively deliver fluid to the motor at a rapid advance rate, deliver fluid to the motor at a feed advance rate, deliver fluid to the motor at a rapid return rate, or deliver fluid back to the source directly, a second control unit comprising a four-way reversing valve connected in series with the first control unit and having a member shiftable between only two positions to selectively deliver fluid to the motor in either direction, and means responsive to motor travel including adjustable dogs for the first control unit and independently adjustable dogs for the second control unit for selectively shifting said members in sequence to produce a cycle of motor travel including a forward and return stroke in one direction with respect to an intermediate position of the motor and alternately therewith a forward and return stroke in the opposite direction with respect to said intermediate position, said cycle including a feed movement during each of said forward strokes and a stop at the end of each return movement, said selective shifting means including a member pre-set during the return movement of the motor for conditioning the second control unit to be shifted only when the first control unit has been shifted to its rapid advance position.

3. In a hydraulic power transmission system the combination with means forming a source of pressure fluid, fluid motor means connected to the source for operation thereby, a standard control panel connected between the motor and source and of the type having a control member normally shiftable between at least four positions providing rapid traverse forward, feed forward and rapid traverse reverse movement of the motor with a motor stopping position intermediate the forward and reverse positions, a reverse valve connected in series with the control panel, and operating means for the panel and reverse valve and controlled by the motor, said operating means acting to shift the panel control member between forward and reverse positions and means pre-set during a motor return stroke to cause shifting of the reverse valve only after the panel control member has been shifted to rapid traverse forward position whereby to produce a cycle of motor travel including rapid traverse and feed strokes in each direction.

MERRILL A. HAYDEN.